United States Patent Office 3,766,079
Patented Oct. 16, 1973

3,766,079
EXOTHERMIC COMPOSITION
Robert M. Jackman, Little Rock, and Junior L. Johnson, Mabelvale, Ark., assignors to A. O. Smith-Inland, Inc., Milwaukee, Wis.
No Drawing. Filed Oct. 13, 1970, Ser. No. 80,475
Int. Cl. B65b 29/10; B65d 29/06
U.S. Cl. 252—188.3 R    7 Claims

ABSTRACT OF THE DISCLOSURE

An exothermic composition capable of generating heat on the addition of water and having particular use for curing the thermosetting resin adhesive joint in pipe sections. The exothermic composition consists of a strong base, an acid component, finely divided inert material and water. The water is pre-mixed with the inert material, being adsorbed on the particles of the inert material, and when the components are blended together a more uniform generation of heat is produced which prevents localized areas of overheating. To increase the generation of heat, finely divided metal powder can be incorporated in the composition and the metal powder will react with the base to provide a second stage of heat generation. To provide a more uniform application of heat to the adhesive joint a multiplicity of small, hollow, thermoplastic microspheres can be incorporated in the composition.

---

The invention relates to an exothermic composition capable of generating heat in the presence of water and has particular application to an exothermic composition to be used for curing the thermosetting resin adhesive employed to join plastic pipe sections together in the field.

Fiber reinforced, thermosetting resin pipe is often utilized for various corrosion resistant applications such as in the oil and chemical industries. In laying the pipeline, the ends of the pipe sections are normally joined together by a thermosetting resin adhesive, such as an epoxide resin. The thermosetting resin adhesives require a period of time for curing, and the conventional adhesives are formulated for room temperature conditions so that curing requires a substantially longer period of time at lower temperatures. For example, an epoxide adhesive which may cure in three hours at 80° F. may require more than 20 hours at a temperature of 50° F.

As pipelines are often installed in relatively cold weather, particularly in the northern areas of the country, where temperatures may be 40° F. or below, it has been the practice in the past to apply heat to the joint to aid in curing the resin adhesive. One method of heating utilized in the past is by means of a heat sink. The heat sink consists of a pair of metal ring sections which are heated by means of an auxiliary gas heater and the heated ring sections are then applied to the area of the joint. The use of the heat sink has not been entirely satisfactory because the temperature has been difficult to control, and secondly, the use of the heat sink requires a substantial inventory due to the fact that different size metal rings are required for different diameter pipe. A further disadvantage of the use of a heat sink is that a considerable investment in equipment is required, and after the curing of the adhesive it is necessary to recover the heat sinks.

Another method used in the past to aid in curing the adhesive joint has been by use of electric heating collars. This method of heating provides a better temperature control than the use of heat sinks, but it requires expensive equipment and transportation of the equipment in the field which is a serious problem.

Another method used in the past has been to attach exothermic compoistions, which are capable of generating heat by the addition of water, around the pipe joint. The common procedure has been to package the reactants in a plastic container and water is then added by means of a hypodermic needle to the components at the site to initiate the exothermic reaction. This system not only requires injection equipment but also demands the precise measurement and injection of water, which is sometimes difficult to accomplish under field conditions. Furthermore, by injecting the water into a zone of the package, localized heating may be obtained rather than uniform heating throughout the entire package.

The invention is directed to an improved exothermic composition which comprises a strong base and an acid component which is capable of reacting with the base in the presence of water to generate heat. The water to initiate the reaction is contained within the package and is adsorbed on a finely divided inert material, such as silica gel. If a liquid acid is employed, the liquid is mixed with the inert material and is located in a separate compartment from the base. However, if a solid acid is used the acid can either be mixed with the inert material or it can be mixed with the base. The two compartments of the package are separated by a divider which can take the form of a plastic or wire tie, or a metal clip. At the site of the use the divider is removed and the components are mixed together. The package is then applied around the joint between the pipe sections and the water adsorbed on the inert material will initiate the reaction between the base and acid to thereby generate heat which aids in curing the thermosetting resin adhesive.

The exothermic composition of the invention has all of the necessary components contained within the package and eliminates the necessity of injecting water into the package to begin the reaction. This not only simplifies the procedure, but insures that the proper amount of water is added to provide the desired reaction and evolution of heat.

The base to be used in the composition is a solid material and can be an alkali metal oxide, an alkaline earth metal oxide, an alkali metal hydroxide, or an alkaline earth metal hydroxide. As an example, the oxides or hydroxides of calcium, barium, sodium, potassium, lithium, strontium, and the like can be used. Strong quaternary ammonium hydroxides in solid form, such as tetramethyl ammonium hydroxide, can also be used. Of these materials, calcium oxide is generally preferred because it is inexpensive and readily available. It is preferred to use the oxides rather than the hydroxides because the oxides will initially react with the water to form hydroxides with the generation of heat. Thus, starting with the oxides provides an additional evolution of heat by the reaction in converting the oxide to the hydroxide.

The acid to be used can be any organic or inorganic acid that is capable of reacting with the hydroxide to generate a substantial quantity of heat and can be in the form of a liquid or solid. Examples of acids which can be employed are sulfamic, sulphuric, citric, tartaric, benzene sulfonic, toluene sulfonic, oxalic, phosphoric, and the like. In addition, strong acid salts such as sodium or potassium hydrogen sulfate can also be used as the acid component.

The inert material is the form of a powder and acts as a carrier for the water. The inert material has a particle size generally in the range of about 50 to 500 mesh and the water is adsorbed and/or absorbed on the particles of the inert material. While the amount of the inert material to be employed is not critical, it should be sufficient that when mixed with the necessary amount of water to provide the desired reaction, the inert or powdered material has a moist, but not wet, feel. For most applications the inert material is used in a weight ratio of 3 to 50 parts of the inert material for each part of water.

The inert material can be selected from, but not limited to, the following finely divided materials: silica gel, silica flour, Cab-O-Sil, asbestos, granite dust, talc, ground anthracite, ground firebrick, siliceous earth, silicic acid, and the like.

When the components are mixed together at the time of use, the powdered inert material serves to provide a more uniform distribution of the water between the reactants, thereby preventing localized reactions and providing a more uniform generation of heat through the package.

The reactants, namely the base, the acid and the water, are used in molar quantities necessary to carry out the desired reactions. The relative amounts of the reactants depend on a number of factors, such as the curing characteristics of the resin adhesive, the ambient temperature, the specific reactants employed, and the diameter of the pipe joint.

The exothermic composition of the invention is packaged as a two component system with the components being mixed together at the time of use to initiate the exothermic reaction. If a liquid acid, such as sulphuric acid is used, the acid is generally mixed with the finely divided inert material and the water, while the base is packaged separately. On the other hand, if a solid acid, such as sulfamic is utilized, the solid acid can either be mixed with the finely divided material and water, or alternately, can be mixed with the base. In a situation where a solid acid is pre-mixed with the oxide or hydroxide, it may be desirable to add a small amount of the finely divided inert material or desiccant to this mixture to absorb any small amount of moisture which may be present and thus prevent any premature reaction.

When the two systems are mixed together, the oxide will initially react with the water to form the hydroxide with the evolution of heat. The hydroxide will then react with the acid to form a salt and water with a second stage generation of heat. The water produced by the second stage reaction is then available to react with the oxide to carry on the first stage reaction.

The temperatures developed can be varied by varying the type and amounts of the reactants and generally, the system is formulated so that a maximum temperature in the range of 200 to 450° F. will be generated and will be maintained for a sufficient period of time to achieve adhesive cure under the prevailing temperature conditions.

To increase the intensity of heat generation, a finely divided metal powder can be incorporated in the exothermic reaction mixture and the metal powder may take the form of aluminum, zinc, magnesium, or gallium. The metal powder has a particle size generally in the range of 50 to 500 mesh.

In this system, the metal powder, as well as the acid, will react with the hydroxide to generate heat. The use of the metal powder, particularly aluminum powder, has a further advantage in that it forms a thick gel which helps to distribute the heat evenly around the adhesive joint. In this ssytem, molar ratios of the components are formulated to provide a sufficient quantity of the oxide or hydroxide to react with both the metal powder and the acid.

When using the metal powder, it can be mixed with the base and the solid acid, if used, and separately packaged from the inert material and water. However, if a liquid acid is to be employed, the metal powder and the base are separately packaged from the liquid acid, the inert material and water. With this system it may be desired to eliminate the inert material in which case the base, solid acid, and the metal powder can be blended and packaged together without water. At the time of use water can then be injected into the system. As previously noted, however, this system has the disadvantage that auxiliary water is required, and for that reason is not as desirable as a system in which water is mixed and adsorbed with the finely divided inert material.

To provide a more uniform application of heat to the adhesive joint, a multiplicity of thermoplastic microspheres can be incorporated in the exothermic composition. The microspheres are made of a thermoplastic resin, such as polyvinylidene chloride and are hollow, with the interior of the spheres containing a blowing agent, such as fluorocarbon gas, (Freon). The spheres are very small, having a diameter in the range of 4 to 20 microns, in the unexpanded state, and 10 to 100 microns in the expanded state, and are used in a proportion of 0.1% to 10% and preferably 0.5% to 2.0% by weight of the total exothermic composition. During the exothermic reaction, the heat activates the blowing agent contained within the microspheres, causing the spheres to expand and rupture. This produces a swelling effect, causing the reaction mixture to completely fill the package and completely envelope the adhesive joint.

The microspheres can be packaged with either of the component systems in the package, although it is preferred to mix the microspheres with the finely divided inert material and water.

The two component mixtures are normally packaged in a moisture impervious plastic envelope or container. Plastic materials, such as polyethylene film or polyester film, have proven satisfactory for the envelope. The material from which the envelope is formed should be waterproof to prevent exterior water or moisture from contacting the components prior to the time of use.

The component mixtures are maintained in separate compartments within the envelope by a divider or separator which can be removed so that the two component mixtures can be blended together prior to applying the envelope to the adhesive joint to be cured. The divider can take the form of a wire or plastic tie, metal clip or the like. To aid in attaching the envelope to the pipe sections, the ends of the envelope can be provided with wires or other fastening devices to secure the envelope snuggly around the outer surface of the pipe sections. The following examples illustrate the preparation and use of the exothermic composition of the invention.

EXAMPLE NO. I 35 gr. of sulfuric acid, 35 gr. water and 300 gr. of silica flour were blended together to provide a mixture which was damp to the touch. This mixture was placed in one compartment of a waterproof polyethylene envelope. 100 gr. of calcium oxide was placed in a second compartment of the envelope and separated from the mixture in the first compartment by use of a plastic tie divider.

Subsequently, the divider was removed and the contents of both compartments were blended together manually to initiate the exothermic reaction. The envelope was attached to the outer surface of a joint between 2" diameter reinforced plastic pipe sections having an epoxide resin adhesive at the joint. The reaction developed a maximum temperature of approximately 300° F. in the bond line, and the temperature was maintained above 150° F. for a period of 30 minutes with an ambient temperature of 0° F. to cure the resin adhesive.

EXAMPLE NO. II 100 gr. of solid sulfamic acid was mixed with 35 gr. water and 200 gr. of silica flour. The resulting mixture was damp to the touch and was introduced into one compartment of a polyethylene envelope. 100 gr. of calcium oxide was placed in the second compartment of the envelope which was separated from the first compartment by a plastic tie.

The tie was removed and the ingredients mixed together to initiate the exothermic reaction. The envelope was attached to the outer surface of a joint between 2" diameter plastic pipe sections containing an uncured epoxide resin adhesive. A temperature of about 350° F. was developed and a temperature above 150° F. was maintained at the adhesive joint for a period of 35 minutes with an ambient temperature of 0° F. to cure the adhesive.

EXAMPLE NO. III 120 gr. of calcium hydroxide, 30 gr. of sulfamic acid, and 15 grams of aluminum powder, having a particle size of approximately 100 mesh were blended together and packaged in a polyethylene bag. 150 gr. of water was injected into the package to initiate the reaction and the package was then wrapped around the joint between 2" diameter plastic pipe sections having an uncured epoxide resin adhesive at the joint. Builder's insulation was applied over the envelope to retain the heat. This formulation produced a temperature at the adhesive joint of above 150° F. for 50 minutes with an ambient temperature of 40° F.

EXAMPLE NO. IV 10 gr. of polyvinylidene chloride microspheres having an average diameter of 4 to 20 microns in the unexpanded state and 10 to 100 microns in the expanded state, 100 gr. of silica flour having a mesh size of 200 to 300 mesh and 35. gr. of water were mixed together, and the mixture placed in one compartment of a polyethylene envelope. 100 gr. of sulfamic acid, 100 gr. of calcium oxide and 100 gr. of silica flour were mixed together to provide a second component mixture which was placed in a second compartment in the plastic envelope. The divider in the envelope was removed and the two component mixtures were blended together to initiate the exothermic reaction. The envelope was then attached around the joint between 2" diameter plastic pipe sections having an epoxide resin adhesive at the joint. This formulation generated a bond line temperaturue above 300° F. with the ambient temperature at 15° F. and with insulation the temperature was maintained above 150° F. for more than 30 minutes to cure the adhesive joint.

Various modes of carrying out the invention are contemplated as being within the scope of the following claims which particularly point out and distinctly claim the subject matter which is regarded as the invention.

We claim:

1. An exothermic composition package, comprising a container containing two separate component systems separated by a removable divider and adapted to be mixed together on removal of said divider to initiate an exothermic reaction, a first of said component systems including a strong basic component selected from the group consisting of alkali metal oxides, alkali metal hydroxides, alkaline earth metal hydroxides, alkaline earth metal oxides, quaternary ammonium hydroxides, and mixtures thereof, and a second of said component systems including an acidic component characterized by the ability to react with the basic component in the presence of water to generate heat and selected from the group consisting of sulfuric acid, sulfamic acid, citric acid, tartaric acid, oxalic acid, phosphoric acid, benzene sulfonic acid, toluene sulfonic acid, sodium hydrogen sulfate, potassium hydrogen sulfate, and mixtures thereof, one of said component systems also containing finely divided particles of an inert material and a quantity of water uniformly distributed through the particles of inert material and adsorbed on said particles, said inert material being present in the weight ratio of 3 to 50 parts of the inert material to one part of water and said basic component and said acid component and said water being present in sufficient quantities to provide an exothermic reaction and the substantial generation of heat, on mixing of said component systems.

2. The package of claim 1, wherein the first component system includes the acid component, the particles of inert material and the water, and said second component system includes the basic component.

3. The package of claim 2, wherein the acidic component is a solid acid.

4. The package of claim 1, wherein one of said component systems includes a quantity of finely divided metal selected from the group consisting of aluminum, zinc, magnesium and gallium, said basic component being present in sufficient molar quantity to react with both the acidic component and the metal powder.

5. The package of claim 1, wherein one of said component systems includes a quantity of hollow expandable thermoplastic microspheres, with the interior of said microspheres containing a fluorocarbon gas, said microspheres being present in an amount of 0.1% to 10% by weight of the mixed component systems and characterized by the ability to expand on being heated by the generation of exothermic heat to cause a swelling of the mixed component systems.

6. The package of claim 5, wherein the microspheres have an average particle size in the range of 4 to 20 microns in the unexpanded state.

7. The package of claim 1, wherein the basic component, the acid component and the water are present in amounts necessary to provide a temperature above 150° F. for more than 50 minutes with an ambient temperature of 40° F.

References Cited
UNITED STATES PATENTS

| | | | |
|---|---|---|---|
| 3,475,239 | 10/1969 | Fearon et al. | 252—188.3 |
| 3,550,578 | 12/1970 | Fearon et al. | 126—263 |
| 3,512,516 | 5/1970 | Glass et al. | 126—263 |
| 3,224,845 | 12/1965 | Thomas | 252—194 |
| 2,261,221 | 11/1941 | Bruner | 44—3 |
| 2,797,201 | 6/1957 | Veatch et al. | 260—2.5 R |
| 2,040,406 | 5/1936 | Reed | 126—263 |

MAYER WEINBLATT, Primary Examiner

I. GLUCK, Assistant Examiner

U.S. Cl. X.R.

44—3R; 126—263; 206—84; 252—70, 188, 194